Patented Mar. 28, 1939

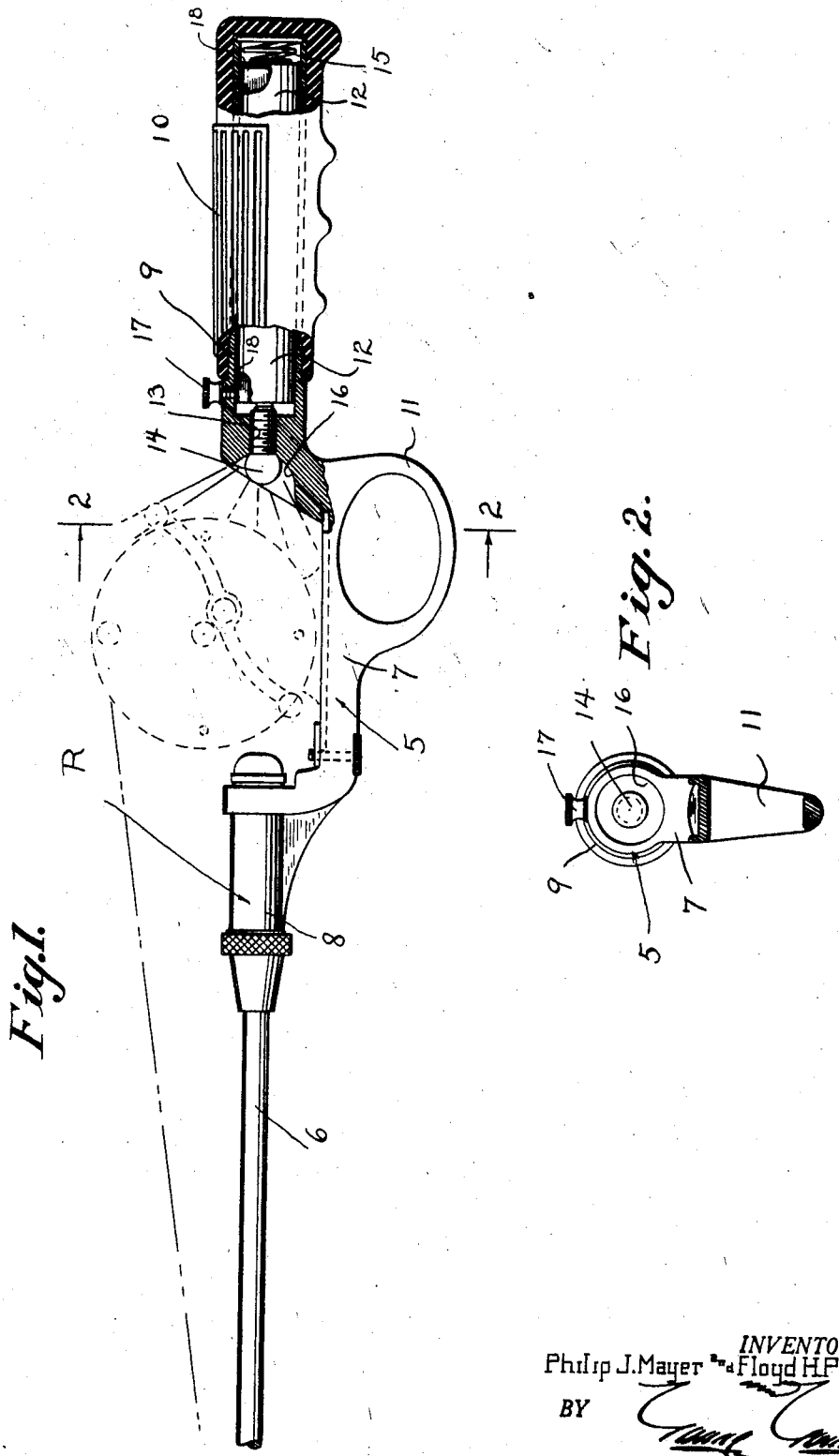

2,152,385

UNITED STATES PATENT OFFICE 2,152,385

FISHING ROD

Philip J. Mayer, West Bend, and Floyd H. Peters, Milwaukee, Wis.

Application January 28, 1938, Serial No. 187,368

1 Claim. (Cl. 43—23)

This invention appertains to fishing rods, and more particularly to casting rods embodying a reel and reel seat.

One of the primary objects of our invention is the provision of novel means for illuminating the reel and reel seat of a fishing rod, whereby to facilitate the use of the reel during night fishing.

Another salient object of our invention is to provide a fishing rod having a flashlight incorporated in the handle thereof, with the bulb disposed in such a manner that the reel will be clearly illuminated during the night-time, the association of the flashlight with the handle being such that no projections or unwieldy parts will be formed on the handle.

A further important object of our invention is to provide a flashlight incorporated with the handle of a fishing rod in such a manner that the handle of the rod can be disconnected from the body of the rod and used as an ordinary flashlight or torch.

With these and other objects in view, the invention consists in the novel construction, arrangement, and formation of parts, as will be hereinafter more specifically described, claimed, and illustrated in the accompanying drawing, in which drawing:

Figure 1 is a fragmentary side elevation of a fishing rod constructed in accordance with my invention, parts of the handle of the rod being shown broken away and in section to illustrate structural details.

Figure 2 is a detail section through the handle, taken substantially on the line 2—2 of Figure 1, looking in the direction of the arrows.

Referring to the drawing in detail, wherein similar reference characters designate corresponding parts throughout the several views, the letter R generally indicates a fishing rod, which includes the handle 5 and the rod section 6.

The handle 5 includes a substantially U-shaped saddle or reel seat 7. Projecting forwardly from the reel seat 7 is a socket 8 for the rod section 6. Projecting rearwardly from the reel seat or saddle 7 is the handle butt 9. As is clearly illustrated in the drawing, the socket 8 and the butt 9 are in longitudinal axial alinement.

The butt 9 has detachably slipped thereover a hand grip 10, which can be formed from rubber or the like, and depending from the saddle 7, directly in front of the hand grip, is a fingerguard 11 for receiving the index finger of the user of the rod.

The base of the reel is placed in the saddle 7 between the socket 8 and the butt 9, and any suitable clamping means can be provided for holding the reel in place.

In accordance with our invention, the butt 9 is of a hollow construction for the reception of a flashlight battery 12. This battery can be slipped into the hollow handle or butt when the hand grip 10 is removed. The forward end of the butt has formed therein a screw-threaded bore 13, which opens into the hollow butt and into the reel seat. The shank of the flashlight bulb 14 is adapted to be threaded into the bore through the front end of the butt 9 into engagement with the central contact of the battery 12. A spring 15 can be utilized for normally pushing the battery forward, so as to insure the engagement of its central contact with the central contact of the bulb.

If desired, the forward end of the butt can be recessed around the bore 13, as at 16, so as to receive the head of the bulb to form a protection therefor and a reflector.

Any desired type of circuit closer or switch can be employed for closing the circuit through the bulb, and, as illustrated, a thumb screw 17 is threaded into the hollow metallic butt 9 for engaging the side contact or case of the battery 12. In the present instance, the side wall and the rear end of the battery are covered by a sheet of insulation 18, and this insulation is cut away at one point only, so that when the screw 17 is turned in one direction, the inner end thereof can be threaded into intimate contact with the bare side contact or shell of the battery. Obviously, when the screw is in contact with the side contact or shell of the battery, the circuit will be completed through the central contact of the battery, through the central contact of the bulb, through the filament, through the shell of the stem of the bulb, through the hollow handle or butt 9, through the screw, back to the battery, through the shell thereof.

By our arrangement and construction, the bulb faces the reel seat or saddle, and, thus, the light from the bulb will clearly illuminate the reel and the reel seat. This permits the effective use of the fishing rod during the night-time.

By removing the rod section 6, the handle can be utilized as an ordinary small flashlight or torch.

Changes in details may be made without departing from the spirit or the scope of our invention, but what we claim as new is:

A fishing rod comprising, a handle having a reel seat and a hollow handle butt, a flashlight battery in said hollow butt, said butt having a bore communicating with the interior thereof and opening out adjacent the reel seat, and a bulb having its stem detachably fitted in said bore for cooperation with the battery.

PHILIP J. MAYER.
FLOYD H. PETERS.